United States Patent [19]

Hirai et al.

[11] 4,203,886
[45] May 20, 1980

[54] FLAME-RETARDANT SILICONE COMPOSITION HAVING X-RAY SHIELDING ABILITY

[75] Inventors: Akira Hirai; Kazuyuki Nishimoto, both of Katano; Hisataka Kuroki, Takatsuki, all of Japan

[73] Assignee: Matsushita Electric Industrial Co., Ltd., Osaka, Japan

[21] Appl. No.: 955,757

[22] Filed: Oct. 30, 1978

[30] Foreign Application Priority Data

Nov. 15, 1977 [JP] Japan .................................. 52-137535

[51] Int. Cl.² .......................... C08K 3/30; C08K 3/24; C08K 3/16
[52] U.S. Cl. .......................... 260/37 SB; 260/45.75 F; 260/45.75 V; 260/45.75 R; 260/45.7 R; 252/478; 250/518; 250/519; 250/520
[58] Field of Search .................. 260/45.75 F, 45.75 V, 260/45.75 R, 45.7 R, 37 SB; 252/478; 250/518, 519, 520

[56] References Cited

U.S. PATENT DOCUMENTS

| | | | |
|---|---|---|---|
| 2,734,042 | 2/1956 | Carter et al. | 252/478 |
| 2,999,078 | 9/1961 | Delphenich | 260/37 SB |
| 3,608,555 | 9/1971 | Greyson | 252/478 |
| 3,668,174 | 6/1972 | Smestad et al. | 260/37 SB |
| 3,836,489 | 9/1974 | Bargain | 260/37 SB |
| 3,839,266 | 10/1974 | Bargain | 260/37 SB |
| 3,936,412 | 2/1976 | Rocholl | 260/37 SB |
| 3,965,065 | 6/1976 | Elliott | 260/37 SB |

Primary Examiner—V. P. Hoke
Attorney, Agent, or Firm—Stevens, Davis, Miller & Mosher

[57] ABSTRACT

A silicone composition having an X-ray shielding ability as well as flame retardancy can be obtained by adding at least one of barium titanate ($BaTiO_3$), barium fluoride ($BaF_2$) and lead sulfate ($PbSO_4$) as an X-ray shielding substance to a silicone composition containing platinum or a platinum compound as a flame-retardant.

10 Claims, No Drawings

FLAME-RETARDANT SILICONE COMPOSITION HAVING X-RAY SHIELDING ABILITY

This invention relates to a flame-retardant and X-ray shieldable silicone composition which may be offered for use in the form of a silicone rubber compound, potting material, varnish, adhesive, etc.

More particularly, this invention is intended to provide a silicone composition having both flame retardant and X-ray shielding ability by adding at least one of barium titanate ($BaTiO_3$), barium fluoride ($BaF_2$) and lead sulfate ($PbSO_4$) as X-ray shielding substance in a silicone composition containing at least platinum or a platinum compound as flame-retardant.

Recently, the silicone compositions are used for a wide variety of purposes because of their excellent electrical, mechanical and various physical properties, and such silicone compositions are offered for practical uses in the form of compounds, potting material, varnish, adhesives, etc. For making such silicone composition flame-retardant, platinum or a platinum compound is usually added as a flame-retarding agent in the composition.

In case said composition is used for the anode cap of the cathode-ray tube in a color television receiver, the composition is required to have X-ray shielding performance in addition to flame retardancy. However, there is yet available no silicone composition which has both flame-retardant and X-ray shielding properties.

Generally, X-ray shielding ability can be imparted to various kinds of material by adding a lead or barium compound. However, in the case of the flame-retardant silicone compositions, because the flame-retarding mechanism thereof depends on a catalytic action, any additive thereto is apt to suffer from catalyst poisoning to deprive the composition of its flame retardancy.

Here, the flame-retarding mechanism in said silicone compositions is briefly reviewed.

It is generally practiced as a flame-retarding means to add a flame-retardant such as used for ordinary organic polymers or to introduce a halogen group into the polymer itself. These means, however, are not used for the silicone compositions because such means involve certain intolerable defects such as producing a toxic gas when the composition is burned.

As for flame retardation of the silicone compositions, Japanese Patent Publication No. 2591/69 has pioneered the art of addition of a platinum compound, and this method is now predominantly employed in preparation of the flame-retardant silicone compositions.

It is believed that the combustion mechanism of silicone rubber comprises the process in which a trimer and tetramer of the starting material siloxane is produced from the following reaction:

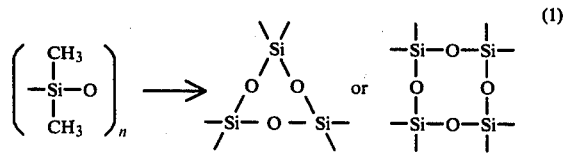

and this causes gradual thermal decomposition of the silicone composition.

The method of the above-cited Japanese patent performs the reaction (1) contrariwise, that is, the produced decomposition components are again addition bonded before being made into a trimer or tetramer, and the following reaction (2) for forming a stereostructure is markedly accelerated by addition of 3 to 250 ppm of a platinum compound.

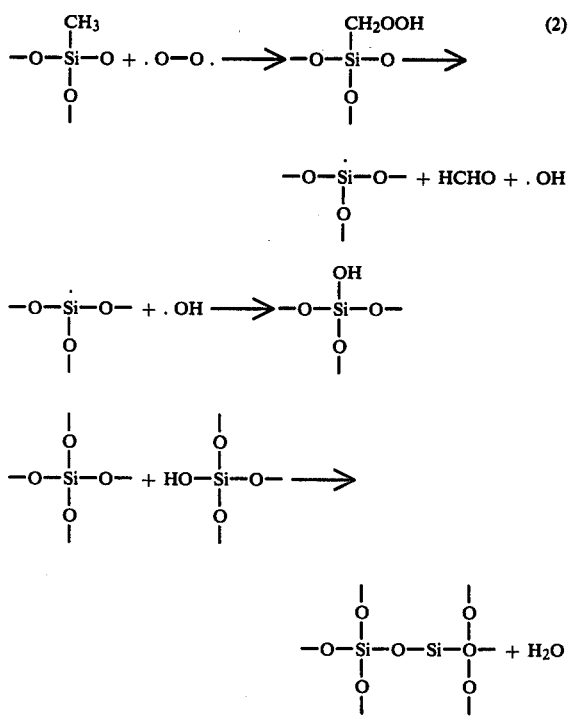

Platinum compounds are the only catalyst which can produce a desired effect by the addition of only a small quantity (in the order of ppm) and are little affected in quality at a temperature of around 180° C. at which the silicone compositions are usually treated.

Presently, attempts are being made for further improving flame retardancy by adding a minute quantity of an organic compound such as benzotriazole, azobisisobutyronitrile, diazoaminobenzene, methylmethacrylonitrile, methylhydrogen polysiloxane, etc., or a metallic oxide such as titanium oxide or nickel oxide. Even in such cases, the platinum catalyst still plays an important role.

In such flame retardation method, however, there exists a very difficult problem, that is, the platinum catalyst, although capable of producing a large effect by addition of a small quantity, is liable to be poisoned by only a trace amount of certain kinds of impurities such as for examples the compounds of non-metals such as N, P, S, etc., or heavy metals such as Pb, Sn, Hg, Bi, etc. It is considered that these impurities act as a radical trapping agent to impede the above-said reaction (2).

The object of this invention, therefore, is to provide a flame-retardant silicone composition to which an X-ray shielding ability can be imparted without sacrificing flame retardancy of the composition by adding platinum or a platinum compound thereto. Thus, the flame-retardant silicone composition according to this invention features incorporation of at least one of barium titanate ($BaTiO_3$), barium fluoride ($BaF_2$) and lead sulfate ($PbSO_4$) as an X-ray shielding substance.

According to the experiments conducted by the present inventors, it was ascertained that none of these three compounds or barium titanate, barium fluoride and lead sulfate, has catalytic poisoning action against platinum or platinum compounds, and hence it is possible to obtain a silicone composition having both excellent flame retardant and X-ray shielding ability by adding at least one of said three inorganic compounds to a silicone composition containing at least platinum or a platinum compound as a flame-retardant. It is not yet clear why these three compounds are inert to the flame retarding action of platinum or platnium compounds, but it is supposed that these compounds do not work as a radical trapping agent.

The dosage of the X-ray shielding substance is properly decided in accordance with various factors such as kind and properties of the organopolysiloxane used as the base resin, amount of filler(s), purpose of use, desired mechanical strength, cost, required degree of X-ray shielding, product thickness and other design requirements.

The X-ray attenuating effect provided by incorporation of the X-ray shielding substance in the composition of this invention may be expressed by the following formula which corresponds to the Lambert-Beer's law on absorbancy.

$$I/Io = e^{-\mu x}$$

where

Io: strength of the X-rays before penetrating the material

I: strength of the X-rays after penetrating the material x: material thickness $\mu$: absorption coefficient (decided by the quality of the X-rays and the kind of the material through which the X-rays penetrate)

Actually, the X-ray attenuating effect differs slightly between monochromatic X-rays and white X-rays. In the case of white X-rays, the value of $\mu$ is variable and there is seen a tendency that $\mu$ decreases, although in driblets, as x increases.

The absorption coefficient of Ba and Pb (per gr of substance) at various wavelengths is shown in Table 1 below.

Table 1

| Wavelength A | Atom | |
|---|---|---|
| | Pb | Ba |
| 0.71 | 141/g | 45.2/g |
| 1.4 | 202 | 307 |
| 1.8 | 354 | 501 |
| 2.29 | 585 | 819 |

In case an X-ray shielding substance is actually incorporated in a silicone composition, the absorption coefficient thereof is decided according to the dosages of the respective atoms therein, so that the required amount of the X-ray shielding substance to be incorporated can be calculated by using the data of Table 1.

In case of using barium titanate which is a strong dielectric, the dielectric constant of the obtained silicone composition can be controlled by adjusting the dosage of said compound, so that it is possible to obtain a silicone composition having a dielectric constant that best matches the properties required for an electronic or electric part to which said silicone composition is adapted.

These three kinds of X-ray shielding substances are capable of producing the same X-ray shielding effect whether they are used singly or in combination.

EXAMPLE 1

A blend comprising 100 parts of organopolysiloxane crude rubber consisting of 99.9 mol% of $(CH_3)_2SiO$ units and 0.1 mol% of $CH_3(CH_2\!=\!CH)SiO$ units, 15 parts of "Aerosil 200" (a trademark for fumed silica manufactured by Japan Aerosil Co. Ltd.), 2.5 parts of diphenylsilanediol serving as silica dispersant, 7 parts of anatase type titanium oxide and 0.05 parts of a 2% (calculated in terms of platinum) butanol solution of chloroplatinic acid was mixed uniformly by two mixing rolls and then treated at 150° C. for one hour to prepare a silicone compound and the base resin for this Example.

Then each of the three compounds, barium titanate, barium fluoride and lead sulfate, was weighed out by a determined amount described later and added to said base resin together with 0.7 parts of a silicone oil paste (hardener) containing 50% of benzoyl peroxide, and the respective mixtures were kneaded sufficiently by two kneading rolls to prepare the sample.

By way of comparison, other compounds such as lead oxide, barium sulfate, lead fluoride, etc., which have been found to have an action detrimental to flame retardance although having an X-ray shielding effect, were also weighed out and added to the base resin similarly to prepare the comparative samples.

Each of these samples was heated at 120° C. under pressure of 50 Kg/cm$^2$ for 20 minutes and then further heated at 150° C. for 3 hours to form a sheet, and each of the thus formed sheets was evaluated by a combustion test as seen in Table 2 below.

The combustion test was conducted in the following way. Each sample sheet, 1.5 mm in thickness, 1.5 cm in width and 15 cm in length, was exposed for 10 seconds to an approximately 18-cm blue flame rising from the end of a Bunsen burner using city gas, and the burning time after removal of the flame was measured. When the flame of the sample went out after first flaming, the sample was again immediately exposed to the flame for 10 seconds and the same measurement was made. This was repeated three times, and the average value of the flame-out times in these three runs of the flaming test was calculated for making comparison. The results are shown in Table 2 below.

Table 2

| Sample | X-ray shielding substance | Dosage (parts) | Burning time (sec) | | | |
|---|---|---|---|---|---|---|
| | | | 1st | 2nd | 3rd | Average (sec) |
| 1 | Base resin alone | — | 3 | 2 | 0 | 1.7 |
| 2 | BaTiO$_3$ | 17 parts | 4 | 0 | 0 | 1.3 |
| 3 | BaTiO$_3$ | 34 | 3 | 0 | 0 | 1.0 |
| 4 | BaTiO$_3$ | 51 | 3 | 0 | 0 | 1.0 |
| 5 | BaF$_2$ | 26 | 3 | 1 | 0 | 1.3 |
| 6 | BaF$_2$ | 52 | 4 | 0 | 0 | 1.3 |
| 7 | PbSO$_4$ | 30 | 3 | 1 | 0 | 1.3 |
| 8 | PbSO$_4$ | 60 | 3 | 0 | 0 | 1.0 |
| 9 | BaTiO$_3$ BaF$_2$ | 17 26 | 2 | 1 | 1 | 1.3 |
| 10 | BaTiO$_3$ BaF$_2$ | 34 26 | 3 | 0 | 0 | 1.0 |
| 11 | BaTiO$_3$ PbSO$_4$ | 17 30 | 4 | 0 | 0 | 1.3 |
| 12 | BaTiO$_2$ PbSO$_4$ | 34 30 | 3 | 1 | 1 | 1.7 |
| 13 | BaF$_2$ PbSO$_4$ | 13 60 | 4 | 0 | 0 | 1.3 |
| 14 | BaTiO$_3$ PbSO$_4$ | 17 30 | 2 | 1 | 0 | 1.0 |

Table 2-continued

| Sample | X-ray shielding substance | Dosage (parts) | Burning time (sec) 1st | 2nd | 3rd | Average (sec) |
|---|---|---|---|---|---|---|
|  | $BaF_2$ | 26 |  |  |  |  |
| 15 | PbO | 5.4 | Burned out |  |  |  |
| 16 | $Pb_3O_4$ | 5.5 | Burned out |  |  |  |
| 17 | $PbF_2$ | 5.9 | Burned out |  |  |  |
| 18 | $BaSO_4$ | 8.5 | Burned out |  |  |  |
| 19 | $Ba(PO_3)_2$ | 10.8 | Burned out |  |  |  |
| 20 | PbO | 30 | Burned out |  |  |  |
| 21 | $BaSO_4$ | 48 | Burned out |  |  |  |

As appreciated from the foregoing results, the silicone compositions to which were added at least one of barium titanate, barium fluoride and lead sulfate as an X-ray shielding substance according to this invention have no difference at all in flame retardency from those not mixed with any of said compounds, and the flame retarding mechanism is not the least affected by addition of said compounds. On the other hand, the samples mixed with X-ray shielding substances other than the above-said three compounds, such as lead oxide (PbO), trilead tetroxide ($Pb_3O_4$), lead fluoride ($PbF_2$), barium sulfate ($BaSO_4$), barium phosphate [$Ba(PO_3)_2$], etc., caught fire upon first exposure to the flame and were completely burned out irrespective of the dosages of such compounds.

Although organopolysiloxane is used in Example 1 described above, it is possible to turn the compositions into a desired form of preparation such as compound, varnish, potting material, adhesive, etc., by changing the kind of said organopolysiloxane and/or the kind of filler(s). Thus, the silicone compositions obtained from Example 1 of this invention can be applied for a variety of uses.

The said three compounds, barium titanate, barium fluoride and lead sulfate, may be previously added to the base resin, or if desired, they may be added to various silicone compositions already prepared as commercial products.

EXAMPLE 2

1.3 parts of a C-3A (a trademark of a curing agent manufactured by Shinetsu Chemical Industry Co., Ltd.) and 0.3 parts of CN-12 (a trademark of a curing agent manufactured by Shinetsu Chemical Industry Co., Ltd.) were added to 100 parts of KE-5612U (a trademark of a silicone rubber compound manufactured by Shinetsu Chemical Industry Co., Ltd.) and to this mixture was further added each of the X-ray shielding substances of this invention in the proportions shown in Table 3. Each mixture was sufficiently kneaded by two kneading rolls, then pre-cured at 150° C. under pressure of approximately 100 Kg/cm² for 30 minutes and then further heated at 200° C. for 5 hours to prepare a 1.5 mm thick sample sheet.

Each of the thus prepared sample sheets was subjected to the same combustion test as practiced in Example 1 and its flame retardency was determined. The results are shown in Table 3 below. It will be seen that the above-said blends can provide the flame-redardent silicone compounds with an X-ray shielding ability.

Table 3

| Sample | X-ray shielding substance | Dosage (parts) | Burning time (sec) 1st | 2nd | 3rd | Average (sec) |
|---|---|---|---|---|---|---|
| 1 | Base resin alone | — | 5 | 2 | 0 | 2.1 |
| 2 | $BaTiO_3$ | 8.5 | 3 | 2 | 0 | 1.7 |
| 3 | $BaTiO_3$ | 17.0 | 4 | 1 | 1 | 2.0 |
| 4 | $BaF_2$ | 6.4 | 4 | 2 | 0 | 2.0 |
| 5 | $BaF_2$ | 12.8 | 3 | 3 | 1 | 2.3 |
| 6 | $PbSO_4$ | 7.3 | 4 | 2 | 0 | 2.0 |
| 7 | $PbSO_4$ | 14.6 | 5 | 2 | 0 | 2.3 |
| 8 | $PbSO_4$ / $BaTiO_3$ | 7.3 / 8.5 | 5 | 3 | 1 | 3.0 |
| 9 | $BaF_2$ / $BaTiO_3$ | 6.4 / 8.5 | 4 | 2 | 0 | 2.0 |
| 10 | $BaTiO_3$ / $BaF_2$ / $PbSO_4$ | 8.5 / 6.4 / 3.6 | 3 | 2 | 1 | 2.0 |
| 11 | PbO | 10.8 | Burned out |  |  | ∞ |
| 12 | $PbF_2$ | 11.8 | Burned out |  |  | ∞ |
| 13 | $BaSO_4$ | 17.0 | Burned out |  |  | ∞ |

EXAMPLE 3

34 parts of barium titanate ($BaTiO_3$) serving as an X-ray shielding substance were added to 50 parts each of KE1204LTV-A and -B, (each being a trademark for an electric and electronic instrument potting material commercially produced by Shinetsu Chemical Industry Co., Ltd.), and each mixture was sufficiently dispersed by a kneader. After vacuum defoaming, each dispersion was put into a mold and heated at 100° C. for 10 minutes. Each of the thus prepared samples was then subjected to the same combustion test as conducted in Example 1. For the purpose of comparison, there were similarly prepared the comparative samples by using 34 parts of $BaSO_4$, 43 parts of $Ba(PO_3)_2$, 22 parts of PbO, 22 parts of $Pb_3O_4$ and 24 parts of $PbF_2$, respectively, in place of barium titanate ($BaTiO_3$) as the X-ray shielding substance. All of these comparative samples caught fire and were completely burned out by the first or second exposure to the flame, whereas the samples containing barium titanate showed substantially the same flame retardency as KE1204LTV and the average burn-out time in three times of flame exposure was 3.2 seconds. This is not much different from that (3.5 seconds) of KE1204LTV, indicating no loss of the self-extinguishing properties (flame retardency) of the composition.

A similar combustion test was also conducted on the samples mixed with 25 parts of barium fluoride and 28 parts of lead sulfate, respectively, in place of barium titanate ($BaTiO_3$) as the X-ray shielding substance. As a result, the average burn-out time was 3.6 seconds and 3.4 seconds, respectively, and no possibility of catalyst poisoning was confirmed.

EXAMPLE 4

10 parts of barium titanate were added as an X-ray shielding substance to 100 parts of KE40RTV (a trademark for self-curing type RTV rubber compound manufactured by Shinetsu Chemical Industry Co., Ltd.), and the mixture was quickly mixed up and then spread and hardened on a Teflon plate to prepare a 1 mm thick sample sheet. This was subjected to the same combustion test as in Example 1. As a result, the flame went out within 3 seconds after 10-second exposure to the burner flame as in the case of KE40RTV, and it was ascertained that no adverse effect is given to the flame retarding mechanism of KE40RTV. Similar sample sheets were prepared by using 5 parts each of barium fluoride and lead sulfate as an X-ray shielding substance and these sheets were subjected to the same combustion test as in Example 1. The average burn-out time of these sheets was 3.0 seconds and 2.9 seconds, respectively, and it was thus possible to obtain the X-ray shieldable sheets retaining high flame retardancy.

EXAMPLE 5

15 parts of barium titanate were added to 100 parts KR-2038 (a trademark of a no-solvent type flame-retardant flexible silicone varnish manufactured by Shinetsu Chemical Industry Co., Ltd.), and the mixture was sufficiently kneaded by a kneader and then further added with 2 parts of D-2038 (a trademark for a curing agent manufactured by Shinetsu Chemical Industry Co., Ltd.) followed by curing in a glass container to form a 0.8 mm thick sample sheet. The results of the combustion test on this sheet showed that the average burning time in three times of flaming was about 2 seconds, indicating retention of the flame-retardant properties of KR-2038 itself.

Similar samples were prepared likewise by using 15 parts each of barium fluoride and lead sulfate and subjected to the same combustion test, the results showing the average burn-out time of 2.1 seconds and 1.9 seconds, respectively. It was thus possible to obtain flame-retardant and X-ray shieldable silicone varnish.

As appreciated from the foregoing, it is possible according to this invention to obtain a flame-retardant silicone composition which is capable of shielding the X-rays by incorporating at least one of barium titanate, barium fluoride and lead sulfate in a silicone composition containing platinum or a platnium compound as a flame retarder.

The silicone compositions intrinsically have excellent anti-tracking properties, but when such compositions are provided with an X-ray shielding ability as intended in this invention, there may be caused some scatter in anti-tracking properties by the addition of the shielding agent. It was experimentally confirmed, however, that such scatter can be eliminated by adding at least one of $Al(OH)_3$, $Mg(OH)_2$ and $Mg_{18}Al_6(OH)_{48}(CO_3)_3.12H_2O$. Such compound(s) is usually added in an amount of more than 1 weight part although this is influenced by the purity of the X-ray shielding substance used. Addition of such compound(s) could maintain the anti-tracking properties at a value of greater than 101 drops in all cases under the measuring conditions of 800 V and 1 A. $Mg_{18}Al_6(OH)_{48}(CO_3)_3.12H_2O$ is called hydrotalcite, which is a double salt of $MgCO_3$, $Mg(OH)_2$ and $Al(OH)_3$. It was also ascertained that the above-said compounds $Al(OH)_3$, $Mg(OH)_2$ and hydrotalcite have no catalytic poisoning action against platinum and platinum compounds.

EXAMPLE 6

The silicone rubber composition obtained in Example 1 was further mixed with $Al(OH)_3$, $Mg(OH)_2$ and hydrotalcite, respectively, with the object of improving the anti-tracking properties, and the properties of the obtained compositions were compared with those of the composition not mixed with any of these compounds.

Table 4 shows the effect of $Al(OH)_3$, $Mg(OH)_2$ and hydrotalcite on flame retardancy. In Table 4, Sample Nos. 2, 3 and 4 show the experimental results as obtained when $Al(OH)_3$ alone, $Mg(OH)_2$ alone and hydrotalcite alone were added respectively to the base resin. Table 5 shows the results of the anti-tracking test and combustion test.

Table 4

| Sample | Additive | Dosage (parts) | Burning time (sec) 1st | 2nd | 3rd | Average (sec) |
|---|---|---|---|---|---|---|
| 1 | Base resin alone | — | 3 | 2 | 0 | 1.7 |
| 2 | Al(OH)$_3$ | 10 | 2 | 1 | 0 | 1.0 |
| 3 | Mg(OH)$_2$ | 10 | 3 | 1 | 0 | 1.3 |
| 4 | Hydrotalcite | 10 | 4 | 4 | 1 | 3.0 |

Table 5

| Sample | Additive | Dosage parts | Number of drops of electrolyte (800 V, 1 A) 1 | 2 | 3 | 4 | 5 | Number of Average (drops) | Burning time (sec) 1st | 2nd | 3rd | Average (sec) |
|---|---|---|---|---|---|---|---|---|---|---|---|---|
| 1 | BaTiO$_3$ | 17 | 13 | 21 | 15 | 38 | 31 | 23.6 | 4 | 0 | 0 | 1.3 |
| 2 | BaTiO$_3$ Al(OH)$_3$ | 17 4 | Over 100 | Over 100 | Over 100 | Over 100 | Over 100 | Over 100 | 3 | 1 | 0 | 1.3 |
| 3 | PbSO$_4$ | 30 | 16 | 8 | 25 | 34 | 17 | 20 | 3 | 1 | 0 | 1.3 |
| 4 | PbSO$_4$ Mg(OH)$_2$ | 30 6 | Over 100 | Over 100 | Over 100 | Over 100 | Over 100 | Over 100 | 3 | 1 | 0 | 1.3 |
| 5 | BaF$_2$ | 26 | 19 | 21 | 17 | 29 | 13 | 19.8 | 3 | 1 | 0 | 1.3 |
| 6 | BaF$_2$ Hydrotalcite | 26 2 | Over 100 | Over 100 | Over 100 | Over 100 | Over 100 | Over 100 | 4 | 1 | 0 | 1.7 |
| 7 | PbSO$_4$ Al(OH)$_3$ | 15 1 | Over 100 | Over 100 | Over 100 | Over 100 | Over 100 | Over 100 | 3 | 2 | 0 | 1.7 |
| 8 | PbSO$_4$ BaTiO$_3$ Mg(OH)$_2$ | 15 15 5 | Over 100 | Over 100 | Over 100 | Over 100 | Over 100 | Over 100 | 4 | 1 | 0 | 1.7 |
| 9 | BaTiO$_3$ BaF$_2$ Al(OH)$_3$ Hydrotalcite | 17 13 2 2 | Over 100 | Over 100 | Over 100 | Over 100 | Over 100 | Over 100 | 3 | 1 | 0 | 1.3 |

As understood from these results, it is possible with this invention to obtain a flame-retardant silicone composition which is capable of effectively shielding the X-rays and also possessed of excellent anti-tracking properties by incorporating at least one of $Al(OH)_3$, $Mg(OH)_2$ and $Mg_{18}Al_6(OH)_{48}(CO_3)_3.12H_2O$ in addition to at least one of barium titanate, barium fluoride and lead sulfate in a silicone composition containing platinum compound as a flame-retardant.

What is claimed is:

1. A flame-retardant silicone composition having X-ray shielding ability characterized in that at least one of barium titanate, barium fluoride and lead sulfate is incorporated as an X-ray shielding substance in a silicone composition containing platinum or a platinum compound as a flame-retardant.

2. A silicone composition according to claim 1, wherein barium titanate is incorporated as an X-ray shielding substance.

3. A silicone composition according to claim 1, wherein barium fluoride is incorporated as an X-ray shielding substance.

4. A silicone composition according to claim 1, wherein lead sulfate is incorporated as an X-ray shielding substance.

5. A silicone composition according to claim 1, wherein barium titanate and barium fluoride are incorporated as X-ray shielding substances.

6. A silicone composition according to claim 1, wherein barium titanate and lead sulfate are incorporated as X-ray shielding substances.

7. A silicone composition according to claim 1, wherein barium fluoride and lead sulfate are incorporated as X-ray shielding substances.

8. A silicone composition according to claim 1, wherein barium titanate, barium fluoride and lead sulfate are incorporated as X-ray shielding substances.

9. A silicone composition according to any one of claims 1 to 8, wherein at least one of $Al(OH)_3$, $Mg(OH)_2$ and $Mg_{18}Al_6(OH)_{48}(CO_3)_3.12H_2O$ is incorporated for improving the anti-tracking properties.

10. A flame-retardant organopolysiloxane composition having X-ray shielding ability comprising an organopolysiloxane at least one compound selected from the group consisting of barium titanate, barium fluoride and lead sulfate in an amount effective to provide X-ray shielding and platinum or a platinum compound in an amount effective to provide flame retardation.

* * * * *